(12) United States Patent
Cieslinski (10) Patent No.: US 11,997,408 B2
(45) Date of Patent: May 28, 2024

(54) IMAGE SENSOR (71) Applicant: Arnold & Richter Cine Technik GmbH & Co. Betriebs KG, Munich (DE)

(72) Inventor: Michael Cieslinski, Munich (DE)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 0 days.

(21) Appl. No.: 17/973,707

(22) Filed: Oct. 26, 2022

(65) Prior Publication Data
US 2023/0128595 A1    Apr. 27, 2023

(30) Foreign Application Priority Data
Oct. 27, 2021    (DE) ............ 10 2021 128 022.2

(51) Int. Cl.
*H04N 25/767* (2023.01)
*H04N 25/772* (2023.01)
*H04N 25/778* (2023.01)

(52) U.S. Cl.
CPC ......... *H04N 25/767* (2023.01); *H04N 25/772* (2023.01); *H04N 25/778* (2023.01)

(58) Field of Classification Search
None
See application file for complete search history.

(56) References Cited

U.S. PATENT DOCUMENTS

| 6,229,191 | B1 | 5/2001 | Cao et al. |
| 6,498,622 | B1 | 12/2002 | Nakashiba |
| 8,102,452 | B1 | 1/2012 | Wyatt |
| 8,253,214 | B2 | 8/2012 | Guidash et al. |
| 8,872,097 | B2 | 10/2014 | Sanson |

(Continued)

FOREIGN PATENT DOCUMENTS

| DE | 10 2004 036 316 A1 | 2/2005 |
| DE | 600 29 908 T2 | 12/2006 |

(Continued)

OTHER PUBLICATIONS

German Search Report dated Aug. 18, 2022 in related German Patent Application No. 10 2021 128 022.2 (seven pages).

(Continued)

*Primary Examiner* — Mark T Monk
(74) *Attorney, Agent, or Firm* — Kilpatrick Townsend & Stockton LLP (57) ABSTRACT

An image sensor for electronic cameras has a plurality of pixels for generating exposure-dependent signals, wherein a respective pixel at least comprises at least one light-sensitive element; a readout node; a transfer gate; a converter transistor; and a selection switch that is connected to a signal output of the converter transistor to selectively couple the signal output to a column line of the image sensor. The column line is coupled or can be coupled to a negative input of an associated column amplifier via an input capacitor, wherein an amplifier output of the column amplifier is connected to a column readout circuit and to a compensation line. The compensation line is coupled via a respective feedback capacitor to the respective readout node of the associated pixels.

9 Claims, 4 Drawing Sheets

(56) References Cited

U.S. PATENT DOCUMENTS

| | | | |
|---|---|---|---|
| 10,791,292 B1* | 9/2020 | Geurts | H04N 25/621 |
| 2005/0023475 A1 | 2/2005 | Li et al. | |
| 2008/0054162 A1 | 3/2008 | Fukuda et al. | |
| 2008/0210846 A1 | 9/2008 | Andrews et al. | |
| 2009/0101798 A1 | 4/2009 | Yadid-Pecht et al. | |
| 2010/0060764 A1 | 3/2010 | McCarten et al. | |
| 2010/0177227 A1 | 7/2010 | Cieslinski | |
| 2012/0097842 A1 | 4/2012 | Wan et al. | |
| 2013/0082313 A1 | 4/2013 | Manabe | |
| 2013/0146749 A1 | 6/2013 | Cieslinski | |
| 2014/0085523 A1 | 3/2014 | Hynecek | |
| 2015/0015757 A1* | 1/2015 | Willassen | H04N 25/77 348/308 |
| 2016/0006965 A1 | 1/2016 | Lee et al. | |
| 2016/0028986 A1 | 1/2016 | Kobayashi | |
| 2016/0225803 A1 | 8/2016 | Korobov et al. | |
| 2016/0365380 A1 | 12/2016 | Wan | |
| 2018/0054576 A1 | 2/2018 | Otaka | |
| 2019/0124278 A1 | 4/2019 | Velichko | |
| 2019/0363115 A1 | 11/2019 | Chuang et al. | |
| 2020/0412980 A1 | 12/2020 | Agranov et al. | |
| 2021/0335870 A1 | 10/2021 | Cieslinski | |

FOREIGN PATENT DOCUMENTS

| | | |
|---|---|---|
| DE | 20 2018 105 975 U1 | 1/2019 |
| EP | 0 475 361 A1 | 3/1992 |
| EP | 1 130 638 A2 | 9/2001 |
| EP | 2 343 738 A1 | 7/2011 |
| EP | 2 324 506 B1 | 5/2013 |
| EP | 2 800 356 A1 | 11/2014 |
| WO | 00/19706 A1 | 4/2000 |

OTHER PUBLICATIONS

European Search Report dated Feb. 7, 2023 in related European Patent Application No. 22200623.1 (eight pages).

* cited by examiner

Prior art

IMAGE SENSOR

This application claims priority to German Patent Application No. 10 2021 128 022.2 filed on Oct. 27, 2021, the disclosure of which is incorporated by reference herein.

The invention relates to an image sensor for electronic cameras, in particular to a CMOS image sensor, comprising a plurality of pixels for generating exposure-dependent signals.

Electronic cameras are, for example, used as motion picture cameras to record motion picture sequences that are later shown in the cinema. In this respect, it is important that these cameras have a high image quality. The recorded images are in particular also changed in brightness, contrast and color during post-production and the end product—the processed motion picture sequence or the film—is projected onto a large screen in the cinema.

Electronic cameras typically use image sensors composed of silicon in CMOS or CCD technology. In such image sensors, the pixels form a pixel field and they are arranged in rows and columns. The pixels can be provided with a color filter array (CFA) to have a different spectral sensitivity. Each pixel comprises at least: a light-sensitive element to generate electric charge from incident light; further a readout node; a transfer gate to selectively couple the light-sensitive element to the readout node and to transfer a generated charge from the light-sensitive element to the readout node; a converter transistor to convert the charge present at the readout node into a voltage signal at a signal output; and a selection switch that is connected to the signal output of the converter transistor via an output line to selectively couple the signal output of the converter transistor to an associated readout line of the image sensor that is typically designated as a column line.

The respective pixel can also comprise a reset switch to selectively couple the readout node to a reset potential. Such an image sensor can further comprise a control circuit for generating control signals for the respective transfer gate, for the respective selection switch and, if applicable, for the respective reset switch of the pixels to selectively read out image signals (or image signals and reference signals) from the readout node. The converter transistor can form an impedance converter that generates a voltage signal at its signal output in dependence on a charge amount present at its input. The column lines of the image sensor can be connected to a respective readout amplifier (commonly designated as a column amplifier) to selectively couple the signal output of the converter transistor to a column line of the image sensor that is associated with a plurality of pixels of the image sensor. A plurality of column lines of the image sensor can further be connected to a signal bus that leads to one or more column amplifier(s) to amplify the (possibly already pre-amplified) voltage signals of a plurality of column lines. The pixels of the image sensor are, for example, addressed row by row and the signals of the pixels are conducted to the column amplifiers (for example at the edge of the pixel field) and from there to an output, are digitized and are optionally offset with calibration data.

To be able to also record motion picture sequences in poor light conditions and to keep the costs for artificial illumination measures on a film set low, it is desirable for the image sensors of electronic cameras to have a high light sensitivity.

It is the object of the present invention to provide an image sensor having an improved image quality.

The present invention is based on the following considerations.

The light sensitivity is substantially determined by the noise of the image sensor. The lowest signal range is especially critical in poor light conditions. The noise of the image sensor is substantially composed of the noise of the respective pixel and the noise of the readout path. The noise of the readout path can be reduced to values of e.g. 80 µV (microvolts) by a suitable design so that it only plays a subordinate role compared to the noise of the pixel of e.g. 180 µV.

The noise voltage in the respective pixel is substantially determined by the converter transistor (e.g. a source follower, SF). The noise of the pixel is the ratio between the signal voltage, which an electron causes, and the noise voltage of the converter transistor (SF). To reduce the noise, either the noise voltage of the converter transistor therefore has to be reduced or the signal voltage, which an electron causes (so-called steepness), has to be increased.

When a photon is absorbed in the light-sensitive element (e.g. a pinned diode), it creates an electron there. Due to a brief control of the transfer gate of the pixel, this electron is transferred to the readout node (e.g. floating diffusion, FD) (wherein a plurality of photoelectrically generated electrons are typically transferred in a readout process). The charge of this respective electron acts on the capacitance of the readout node (FD) and causes a voltage change there that is inversely proportional to the capacitance of the readout node. To increase the signal voltage caused by an electron and thereby to reduce the noise of the pixel, an attempt can therefore be made to reduce the capacitance of the readout node (FD).

In typical image sensors, the readout node of the respective pixel can have a capacitance of, for example, 1.6 fF (femtofarad), whereby a voltage change of approximately 100 µV per electron is achieved. The FD capacitance can, for example, be reduced to 0.6 fF by further methods, for example the use of a guarding structure, whereby a voltage change of approximately 260 µV per electron can be achieved.

It is, however, desirable to further reduce the noise. This can be achieved by reducing the capacitance of the readout node even further and thus by increasing the signal voltage caused by an electron at the readout node. The capacitance of the readout node is essentially a parasitic capacitance to ground. So that such capacitances are as ineffective or as small as possible, the voltage at the readout node has to remain constant. However, when electrons are transferred from the light-sensitive element to the readout node and hereby bring about a voltage change at the readout node, this voltage change in turn influences the capacitance of the readout node. To significantly increase the sensitivity of the image sensor, the voltage at the readout node therefore has to be kept constant so that a low capacitance at the readout node and thus a higher signal voltage per electron are achieved and are also maintained on a charge transfer to the readout node.

Said object is satisfied by an image sensor having the features of claim 1.

In the image sensor, a column amplifier is associated with the column line, wherein the column line is coupled or can be coupled (e.g. via a switch) to a negative input of the column amplifier via an input capacitor. The column amplifier has an amplifier output for outputting an amplifier output signal, wherein the amplifier output is connected to a column readout circuit and to a compensation line. The compensation line can also be designated as a compensating line. The compensation line is coupled via a respective feedback capacitor to the respective readout node of those pixels that are associated with the column line.

Thus, the voltage signal that is generated at the signal output of the converter transistor of the respective pixel can effectively be capacitively fed back to the readout node of the respective pixel. In other words, a counter-feedback loop is formed that comprises the column line, the input capacitor, the column amplifier (via its negative input), the compensation line and the feedback capacitor.

The feedback capacitor, which is (indirectly) coupled or couplable to the readout node, ensures that, in the event of a charge transfer from the light-sensitive element to the readout node of the respective pixel, a regulation of the voltage of the readout node by the column amplifier or the amplifier output is possible. The voltage at the readout node can in particular be regulated so that a reduced capacitance is present at the readout node. Thus, an increased signal voltage per electron can be achieved at the readout node of the respective pixel.

The feedback capacitor thus determines the signal voltage per electron and thereby determines the sensitivity of the pixel. A desired signal voltage per electron can be achieved by the feedback and a corresponding dimensioning of the feedback capacitor. To obtain a signal voltage of, for example, 4000 μV per electron, a capacitance of the readout node of approximately 40 aF (attofarad) is required. The feedback capacitor can in this respect be dimensioned very small since in particular the capacitance between the column line and the readout node is decisive.

The numerical values mentioned above are to be understood as examples. The effect achieved by the feedback capacitor can also be stronger or weaker.

Such an active limitation of the capacitance of the readout node is in particular suitable for low signal strengths in poor light conditions, i.e. for a small number of electrons that are transferred from the light-sensitive element to the readout node per actuation of the transfer gate. The light-sensitive element of the respective pixel can also be successively read out in this way in multiple repetitions, wherein partial results are achieved that can be added together. For larger charge amounts in the light-sensitive element, in contrast, conventional readout methods can be used without the explained counter-feedback via the feedback capacitor.

The invention can also be used with a pixel architecture and/or a readout architecture that is/are more complex than mentioned above. For example, an overflow capacitor having an additional transfer gate can be provided within the respective pixel, as will be explained below. In some embodiments, the respective pixel can also comprise a plurality of light-sensitive elements that are connected or can be coupled via a respective transfer gate to a common readout node (FD) (so-called "sharing") and/or that are associated (alternating in time) with a common converter transistor. Furthermore, it is possible for the image sensor to have a plurality of column lines for each column of pixels, wherein a plurality of column lines can be coupled or couplable to a common column amplifier via a signal bus. Furthermore, it is possible for a plurality of channels having different gain factors to be provided for each pixel.

If reference is made to an electrical voltage or an electric potential in connection with the invention, it must be taken into account that the electrical voltage is defined as the difference between a first potential (e.g. a generated or considered potential) and a second potential (e.g. a reference potential). If the respective reference potential is given, the two terms can in this respect ultimately be equivalent or used in an equivalent manner.

If reference is made in connection with the invention to lines in the image sensor, electrically conductive connections are to be understood here that can in particular be formed on or within a substrate, for example, by metallization or doping.

Further embodiments of the invention will be explained in the following.

In some embodiments, the column amplifier can be configured to generate the amplifier output signal in dependence on the voltage signal of the converter transistor of the respective pixel received via the column line at the input capacitor and to output the amplifier output signal to the column readout circuit and, via the compensation line, to the feedback capacitor.

For example, an electrical voltage generated at the readout node can be output as a voltage signal to the column line via the converter transistor when the selection switch is open. The voltage signal at the column line can in particular follow (in particular as a directly proportional value) the voltage that was generated at the readout node of the respective pixel, for instance, due to a charge transfer via the transfer gate. The voltage difference present between the column line and the negative input of the column amplifier can ensure that the input capacitor arranged between the column line and the negative amplifier input charges in accordance with the voltage difference. Depending on the operating mode of the column amplifier, the amplifier output signal can adopt a different value, as will be explained further below. The amplifier output signal is transmitted both to the column readout circuit and, via the compensation line, to the feedback capacitor.

The column readout circuit can output corresponding signal values that ultimately correspond to image information. The explained counter-feedback loop to the respective readout node can be formed via the compensation line and the feedback capacitor.

In some embodiments, the column readout circuit can be configured to read out the amplifier output signal. The column readout circuit can in particular be configured to output a signal value corresponding to the amplifier output signal.

In some embodiments, the column readout circuit can in particular be configured to read out a reference signal and an image signal as amplifier output signals and to offset them against one another (in particular by subtraction) to eliminate offset values (so-called correlated double sampling), as will be explained further below.

In some embodiments, the converter transistor of the respective pixel, the column line, the input capacitor, the column amplifier, the compensation line and the feedback capacitor of the respective pixel can form a counter-feedback loop for the readout node of the respective pixel. Due to such a counter-feedback loop, an unwanted increase in the voltage and thus an unwanted increase in the capacitance of the readout node due to a charge transfer can be counteracted.

The input capacitor, the column amplifier and the feedback capacitor of the respective pixel can in particular be configured (arranged and dimensioned) to keep a voltage at the readout node of the respective pixel substantially constant.

Such counter-feedback does not have to be take place permanently. However, the column amplifier can also form a merely temporary feedback via said elements. For the time period of the feedback, the column amplifier can regulate the voltage at the compensation line so that the voltage at the readout node of the respective pixel also remains substantially constant in the event of a charge transfer (from the light-sensitive element, via the transfer gate).

In some embodiments, the input capacitor, the column amplifier and the feedback capacitor of the respective pixel can be configured, in the event of a charge increase at the readout node of the respective pixel, to increase a voltage at the compensation line and hereby to substantially compensate a voltage change at the readout node. This feedback may make use of the fact that the voltage at the column line follows the voltage at the readout node and that the voltage at the column line is also available at the column amplifier via the input capacitor.

In some embodiments, the column amplifier can comprise—in addition to the negative amplifier input—a positive amplifier input to which a reference voltage is applied. The reference voltage can in particular be used as a reference value to carry out the explained counter-feedback and to improve an accuracy of the measurement. Due to a negative feedback, the reference voltage can in particular be reflected onto the negative amplifier input in order to bring the latter and the input capacitor connected thereto to defined starting values for a subsequent measurement.

The column amplifier can in particular comprise an operational amplifier having a negative amplifier input and a positive amplifier input.

In some embodiments, the negative amplifier input of the column amplifier can be connectable to the amplifier output via a negative feedback line and a negative feedback switch, wherein, by closing the negative feedback switch, the column amplifier can be brought into a negative feedback mode in which a potential difference between the voltage at the column line and the reference voltage is set at the input capacitor. The column amplifier can in particular operate as a voltage follower in the negative feedback mode, i.e. the amplifier output signal can correspond to the input voltage at the positive input of the column amplifier, i.e. to the applied reference voltage.

By subsequently opening the negative feedback switch, the column amplifier can be brought, starting from the negative feedback mode, into an amplification mode in which the amplifier output signal represents a potential difference at the input capacitor that is changed with respect to the negative feedback mode. The change in the potential difference at the input capacitor can in particular result from an intermediate charge transfer from the light-sensitive element to the readout node of the respective pixel and from a corresponding change in the voltage signal of the respective converter transistor. In the amplification mode of the column amplifier, the amplifier output signal can consequently represent a voltage change at the readout node of the respective pixel and thus the number of electrons transferred to the readout node. In the amplification mode, the column amplifier can in particular operate as a differential amplifier.

In some embodiments, the image sensor can have a control circuit that is configured to first bring the column amplifier into the negative feedback mode for a readout of the respective pixel; subsequently to bring the column amplifier into the amplification mode; thereafter to at least partly open the transfer gate of the respective pixel for a short time in order to transmit charge into the readout node of the respective pixel; and then to control the column readout circuit to read out the amplifier output signal that then represents a signal value or an image signal value of the respective pixel. The control circuit can, for example, comprise an integrated circuit, a microprocessor or an FPGA.

During the entire readout process of such a kind, the selection switch of the respective pixel can be closed. The negative feedback mode can, as already explained, be initiated by closing the negative feedback switch. The input capacitor can be brought to a defined start value by the negative feedback mode. The subsequent amplification mode can be initiated by opening the negative feedback switch. In the amplification mode, the amplifier output signal can represent the charge transferred to the readout node of the respective pixel. In addition, the column amplifier can be in a feedback mode during the amplification mode, i.e. the amplifier output signal is capacitively fed back to the readout node of the respective pixel via the compensation line and the feedback capacitor.

In some embodiments, the respective pixel can further have a reset switch to selectively couple the readout node to a reset potential. The control circuit can be configured to briefly close the reset switch of the respective pixel to remove the charge present in the readout node of the respective pixel; and thereafter, in the amplification mode of the column amplifier and before controlling (i.e. opening) the transfer gate, to control the column readout circuit to read out the amplifier output signal that then represents a reference value or a reference signal value of the respective pixel.

Based on the read-out reference value, a magnitude of the voltage change generated by the charge transfer to the readout node can be determined with a higher accuracy. The reference value can in particular be subtracted from said signal value (determined with the transfer gate open) (so-called correlated double sampling).

In some embodiments, the column readout circuit can have a reference value readout path and a signal value readout path for this purpose. The readout of the reference value can in particular take place via the reference value readout path and the readout of the signal value can in particular take place via the signal value readout path, wherein the readout of the reference value and the readout of the signal value can take place at different points in time.

In some embodiments, the respective pixel can further comprise an overflow capacitor and a further transfer gate to selectively couple the readout node to the overflow capacitor. The capacitance of the pixel can hereby be selectively temporarily increased to be able to receive large charge amounts from the light-sensitive element at a high exposure. Said control circuit can be configured to also generate control signals for the further transfer gate.

The invention will be described in the following with reference to embodiments and to the drawings, wherein the same elements or elements of the same type are characterized by the same reference numerals.

The basic operation of an exemplary four-transistor image sensor of the APS (active pixel sensor) type will be explained in the following with respect to FIG. 1 for the better understanding of the invention, with individual components of this image sensor also being present in an image sensor in accordance with the invention. In general, the present invention is, however, not restricted to active four-transistor image sensors, but can rather also be used in image sensors having fewer or more than four transistors per pixel, as will be explained in the following.

Figure 1:
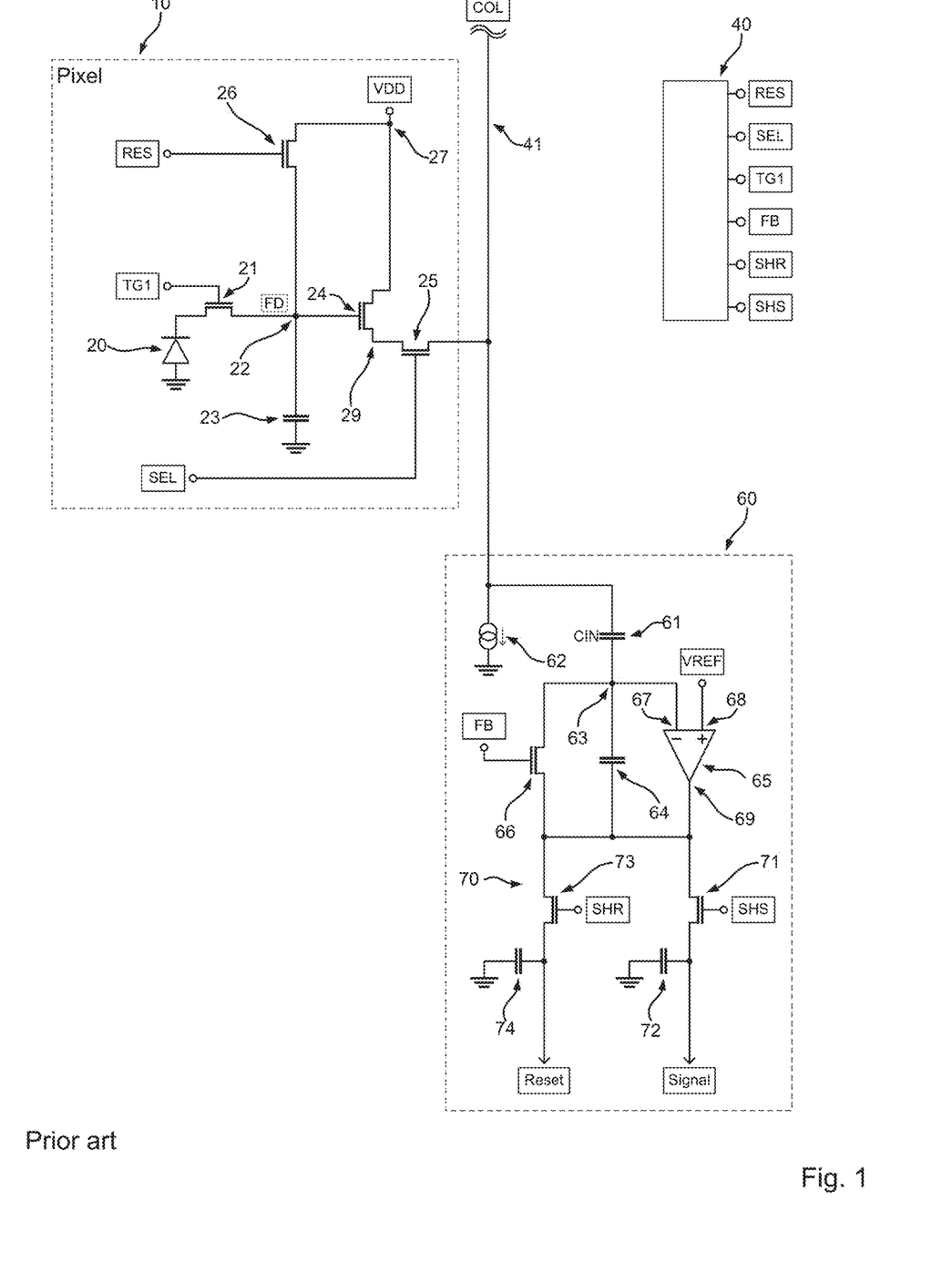
FIG. 1 shows a four-transistor CMOS image sensor; with, of the image sensor, only one pixel and a column amplifier circuit associated with the column line of the pixel being shown.

Only a single pixel 10 is shown as representative in FIG. 1 that comprises a light-sensitive element 20 in the form of a photodiode, in particular in the form of a so-called pinned diode. The light-sensitive element 20 can selectively be charge-coupled via a switch in the form of a transfer gate 21 to a readout node 22 that can in particular be formed as a so-called floating diffusion (FD).

The readout node 22 is connected to the gate terminal of a converter transistor 24 that is configured as a source follower, that is formed by a field effect transistor (FET) and that represents a charge-to-voltage converter circuit. Furthermore, the readout node 22 is connected to a terminal 27 of a voltage supply VDD (for example, a positive voltage supply) via a further switching device in the form of a reset switch 26. One of the two channel terminals (drain terminal) of the converter transistor 24 is likewise connected to the positive voltage supply VDD, whereas the other of the two channel terminals (source terminal) of the converter transistor 24 forms a signal output 29 at which a voltage signal is output and which is connected to a selection switch 25. The selection switch 25 functions as a row selection switch, wherein the signal output 29 of the converter transistor 24 can be selectively coupled to a column line 41, which is associated with the represented pixel 10, by activating or closing the selection switch 25.

The column line 41 (COL) is provided to connect a plurality or all the pixels 10 of the same type arranged in an associated column to a common column amplifier circuit 60 that is, for example, arranged outside the pixel field of the image sensor. This takes place in an alternating manner by temporarily closing the respective selection switch 25 of the pixels 10.

The column amplifier circuit 60 comprises an input capacitor 61 (CIN) that is connected to the column line 41 and to a voltage node 63. The column amplifier circuit 60 further comprises a column amplifier 65 whose negative input 67 is connected to the voltage node 63 and to whose positive input 68 a reference voltage VREF is applied. An amplifier capacitor 64 is further connected to an output 69 of the amplifier and to the voltage node 63. In parallel thereto, a negative feedback switch 66 is connected to the amplifier output 69 and to the voltage node 63 via a negative feedback line. The amplifier output 69 is furthermore connected to a column readout circuit 70 that comprises a reference value capacitor 74 of a reference value readout path, wherein the reference value capacitor 74 is connected to ground by one terminal and can be selectively coupled to the amplifier output 69 via a reference value switch 73 by the other terminal. The column readout circuit 70 further comprises a signal value capacitor 72 of a signal value readout path, wherein the signal value capacitor 72 is likewise connected to ground by one terminal and can likewise be selectively coupled to the amplifier output 69 via a signal value switch 71 by the other terminal.

A pre-charge circuit, which comprises a power source 62, is further associated with the column line 41 outside the pixel field of the image sensor.

The transfer gate 21 of the respective pixel 10 is controllable via a control line TG1; the reset switch 26 is controllable via a control line RES; the selection switch 25 is controllable via a control line SEL; the negative feedback switch 66 is controllable via a control line FB; the reference value switch 73 is controllable via a control line SHR and the signal value switch 71 is controllable via a control line SHS by a common control circuit 40 of the image sensor.

The operation principle of such a pixel 10 will be described below by way of example based on a 3.3V CMOS technology. This process is also called "correlated double sampling" (CDS). Typically, all the pixels 10 in a row are read out in the same manner and in particular in parallel such that it is sufficient for the description of the readout process to only look at those pixels 10 that are connected to the same column line 41.

The light incident during an exposure process is converted by the light-sensitive element 20 of the respective pixel 10 into electric charge such that the light-sensitive element 20 fills with electrons. During the exposure process, the control lines TG1, SEL and RES are each maintained at 0 V, i.e. the switches 21, 24, 26 controlled hereby are open.

Prior to the actual readout of the respective pixel 10, a voltage of 3.3 V is briefly applied to the control line RES to remove charge formed by leakage currents and/or by scattered light from the readout node 22, i.e. to delete the readout node 22. The readout node 22 is therefore set to a starting state defined by the voltage supply VDD. A voltage that corresponds to the charge at the deleted readout node 22 is thus adopted at the signal output 29 of the converter transistor 24.

Furthermore, a voltage of 3.3 V is applied to the control line FB to close the negative feedback switch 66 so that the column amplifier 65 is negative coupled. A voltage of VREF is hereby adopted at the negative input 67 of the column amplifier 65 and thus at the voltage node 63 and at the associated terminal of the input capacitor 61.

To read out a reference value, a voltage of 3.3 V is applied to the control line SEL so that the selection switch 25 is closed. A voltage signal of the converter transistor 24 corresponding to the charge in the readout node 22 is hereby switched via the selection switch 25 to the column line 41 and thus to the input capacitor 61. The input capacitor 61 is thus charged to the potential difference between the reference voltage VREF and the voltage at the column line 41. Furthermore, the negative feedback switch 66 is opened (control line FB is set to 0 V). Due to the switching process, a small disturbance (e.g. a charge injection) is produced. The column amplifier 65 readjusts accordingly. A voltage of 3.3 V is now briefly applied to the control line SHR to close the reference value switch 73 and hereby to charge the reference value capacitor 74 in accordance with the amplifier output signal. After the reference value switch 73 has been opened again, a reference value can thus be read out from the reference value capacitor 74.

To read out a signal value, a voltage of 3.3 V or less is then briefly applied to the control line TG1 to at least temporarily open the transfer gate 21 of the respective pixel 10 for a short time or to close the switch that is hereby formed so that the electrons generated in dependence on the exposure can be transferred from the light-sensitive element 20 to the readout node 22. A changed voltage signal of the converter transistor 24 corresponding to the changed charge in the readout node 22 is transferred via the selection switch 25 (again or still closed) to the column line 41 and thus to the input capacitor 61. The column amplifier 65 amplifies this changed signal in the ratio of the capacitances of the input capacitor 61 and the amplifier capacitor 64 (negative feedback switch 66 remains open) and generates a corresponding changed amplifier output signal at the amplifier output 69. Therefore, a voltage is now applied to the output 69 of the column amplifier 65 that, starting from the starting state of the readout node 22 (offset value), corresponds to the voltage change (voltage drop) due to the transfer of electric charge from the light-sensitive element 20 to the readout node 22. A voltage of 3.3 V is briefly applied to the control line SHS to close the signal value switch 71 and hereby to charge the signal value capacitor 72 in accordance with the changed amplifier output signal. After the signal value switch 71 has been opened again, a signal value (image signal value) can thus be read out from the signal value capacitor 72.

The difference between the read-out reference value and the signal value corresponds to the charge amount that was transferred from the light-sensitive element 20 to the readout node 22 by opening the transfer gate 21.

Thereafter, if necessary, a voltage of 3.3 V can be briefly applied to the control line RES again to remove the present charge from the readout node 22 and to repeat the explained readout process for a further partial charge amount that is transferred from the light-sensitive element 20 to the readout node 22 (readout of a reference value and a signal value) by an even greater opening of the transfer gate 21.

Finally, a voltage of 3.3 V can also be briefly applied to the control lines RES and TG1 to remove both the charge from the readout node 22 and any residual charge from the light-sensitive element 20 so that the next exposure process can again start with a completely "empty" pixel 10.

These steps are also carried out for the further pixels 10 connected to the respective column line 41.

Figure 2:
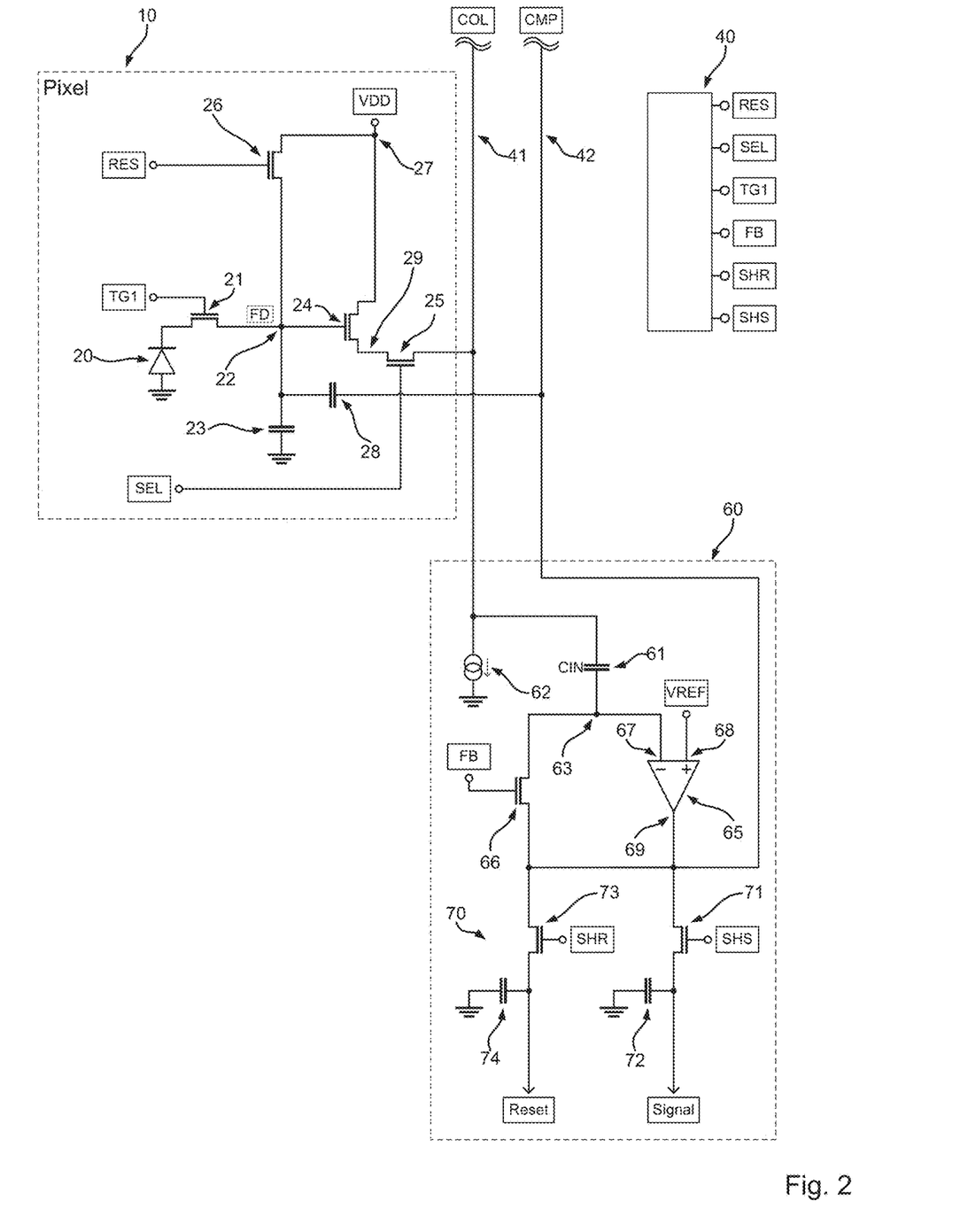
FIG. 2 shows an image sensor in accordance with the invention in a manner of representation corresponding to FIG. 1.

FIG. 2 shows parts of an image sensor in accordance with the invention, wherein a four-transistor image sensor is again illustrated by way of example and only a single pixel 10 is shown as representative even though the image sensor has a plurality of pixels 10 arranged in rows and columns. In particular the main differences from the image sensor in accordance with FIG. 1 will be explained below.

A difference from the image sensor in accordance with FIG. 1 is that, in addition to the column line 41, the respective pixel 10 is coupled to a compensation line 42 (CMP) that extends in parallel with the column line 41 and, like the column line 41, is associated with a column of pixels 10. The compensation line 42 is connected at one end to the amplifier output 69 of the column amplifier 65 of the associated column line 41. At the other end, the compensation line 42 branches to the pixels 10 associated with the column line 41 and is capacitively coupled to the readout node 22 of the respective pixel 10 via a respective feedback capacitor 28.

A further difference from the image sensor in accordance with FIG. 1 is that no amplifier capacitor 64, but rather only the negative feedback switch 66, is arranged between the negative input 67 of the column amplifier 65 and the amplifier output 69.

The image sensor in accordance with FIG. 2 can be operated at a high light sensitivity even with small charge amounts, which are transferred from the light-sensitive element 20 to the readout node 22 of the respective pixel 10, and thus enables the recording of motion picture sequences even in poor light conditions. This is achieved by a high sensitivity (steepness of the gain characteristic) of the respective readout node 22.

The converter transistor 24 of the respective pixel 10, the column line 41, the input capacitor 61, the column amplifier 65, the compensation line 42 and the feedback capacitor 28 of the respective pixel 10 form a respective counter-feedback loop for the readout node 22 of the respective pixel 10. The counter-feedback loop has the result that a voltage change in the readout node 22, which is caused by the charge carriers transferred from the light-sensitive element 20 to the readout node 22, is compensated by an active feedback of the amplifier output 69 to the readout node 22. The column amplifier 65 can in particular counteract a voltage drop at the readout node 22 by increasing the voltage at the amplifier output 69 or at the compensation line 42 so that the voltage at the readout node 22 can be kept substantially constant due to the capacitive coupling via the feedback capacitor 28. Parasitic capacitances at the readout node 22 (illustrated by the reference numeral 23 in FIG. 2) thus become substantially ineffective. Therefore, the gain characteristic is not impaired by the charge carriers transferred to the readout node 22 and by an increase in the (parasitic) capacitance that is hereby caused.

Due to a dimensioning of the feedback capacitor 28 with a capacitance of, for example, 40 aF or less, a signal voltage of approximately 4000 µV per electron can thus be achieved in the readout node 22, which corresponds to a noise value of 0.05 electrons. As an example, an MIM (metal-insulator-metal) capacitor can be used as the feedback capacitor 28 by using the capacitance between two line ends.

Similarly to as explained for the image sensor in accordance with FIG. 1, a negative feedback mode of the column amplifier 65 can first take place for a readout of the respective pixel 10 to set the input capacitor 61 to a defined start value, and subsequently an amplification mode of the column amplifier 65 can take place. In the amplification mode, the column amplifier 65 can generate the amplifier output signal in dependence on the voltage signal of the converter transistor 24 received at the input capacitor 61 via the column line 41 and to output the amplifier output signal to the feedback capacitor 28 via the compensation line 42.

A possible readout process will be described below.

Prior to the actual readout of the respective pixel 10, a voltage of 3.3 V is briefly applied to the control line RES to briefly close the reset switch 26 and to delete the readout node 22 (starting state of the readout node 22). A voltage that corresponds to the (residual) charge at the deleted readout node 22 is thus adopted at the signal output 29 of the converter transistor 24. A voltage of 3.3 V is further applied to the control line FB to close the negative feedback switch 66 so that the column amplifier 65 is negative coupled. A voltage of VREF is hereby adopted at the negative input 67 of the column amplifier 65 and thus also at the voltage node 63 and at the associated terminal of the input capacitor 61.

To read out a reference value, a voltage of 3.3 V is applied to the control line SEL so that the selection switch 25 is closed. A voltage signal of the converter transistor 24 corresponding to the charge in the readout node 22 or to the starting state of the readout node 22 is hereby connected via the selection switch 25 to the column line 41 and thus to the input capacitor 61. The input capacitor 61 is thus charged to the potential difference between the reference voltage VREF of the column amplifier 65 and the voltage at the column line 41.

Furthermore, the negative feedback switch 66 is opened. Due to the switching process, a small disturbance (e.g. a charge injection) is produced. The column amplifier 65 readjusts in accordance with the voltage difference present at the two inputs 67, 68. A voltage of 3.3 V is applied to the control line SHR at this point in time or is now being applied to close the reference value switch 73 and hereby to charge the reference value capacitor 74 in accordance with the amplifier output signal. After the reference value switch 73 has been opened again, a reference value can thus be read out from the reference value capacitor 74.

To read out a signal value, a voltage of 3.3 V or less is thereafter briefly applied to the control line TG1 to partly or fully open the transfer gate 21 of the respective pixel 10 for a short time so that the electrons generated in dependence on exposure (or a portion thereof) are transferred from the light-sensitive element 20 to the readout node 22. In this time period, the selection switch 25 for the connection to the column line 41 can be briefly opened or the selection switch 25 can remain closed. A voltage signal of the converter transistor 24 changed in accordance with the changed charge in the readout node 22 is transmitted via the selection switch 25 to the column line 41 and thus to the input capacitor 61. Due to the coupling of the input capacitor 61 to the negative input 67 of the column amplifier 65, a potential change at the negative input 67 results. The column amplifier 65 generates a changed amplifier output signal at the amplifier output 69 that corresponds to the potential difference between the two inputs 67, 68, i.e. to the further potential change relative to VREF. The amplifier output signal thus represents the electric charge that was transferred from the light-sensitive element 20 to the readout node 22, starting from the starting state of the readout node 22 (offset value), by opening the transfer gate 21. The column amplifier 65 compensates the effect of the charge in the readout node 22 of the respective pixel 10 by increasing the voltage at the compensation line 42 in accordance with the amplifier output signal until (due to the capacitive coupling to the readout node 22) the voltage in the readout node 22 corresponds to the original value again.

A voltage of 3.3 V is applied to the control line SHS to briefly close the signal value switch 71 and hereby to charge the signal value capacitor 72 in accordance with the amplifier output signal. After the signal value switch 71 has been opened again, a signal value (image signal value) can thus be read out from the signal value capacitor 72. Furthermore, the difference between the read-out reference value and the read-out signal value can be formed.

However, in addition to generating the signal value, the amplifier output signal is also used for the counter-feedback explained. For this purpose, the amplifier output signal is, as explained, also conducted to the feedback capacitor 28 of the respective pixel 10 via the compensation line 42 to keep the voltage at the readout node 22 substantially constant.

This readout process can be performed at least for small charge amounts or at a low exposure. The readout process can also be repeated multiple times to transfer and read out partial charge amounts to the readout node 22 by a multiple, increasing opening of the transfer gate 21.

To achieve high dynamics, the readout method can be combined with other readout methods that allow a higher number of electrons to be read out simultaneously. For example, before or after the explained readout process, a readout process can take place during which the negative feedback switch 66 remains closed. The voltage VREF is then permanently applied to the compensation line 42, wherein the pixel 10 behaves like an ordinary four-transistor pixel. For example, an alternative amplifier circuit 80 can also be used for large charge amounts, as will be explained below in connection with FIG. 3.

Figure 3:
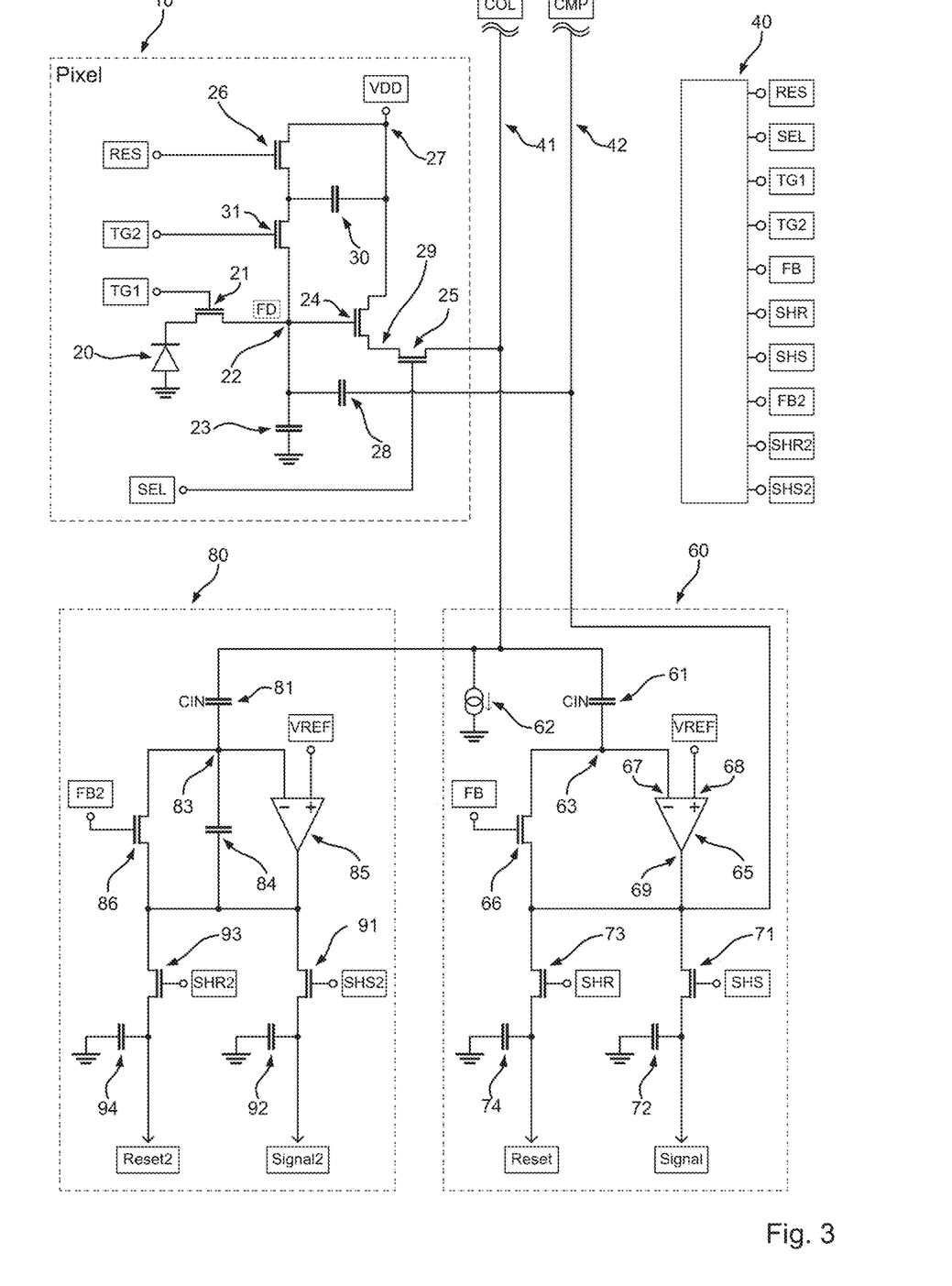
FIG. 3 shows an alternative embodiment of the respective pixel of an image sensor in accordance with FIG. 2.

FIG. 3 illustrates, on the one hand, that in parallel with the explained amplifier circuit with counter-feedback via a compensation line 42 (marked by the reference numeral 60 in FIG. 3), a further amplifier circuit 80 can also be provided for large charge amounts (elements of the same type as in the amplifier circuit 60 are marked by reference numerals increased by the number 20 in the amplifier circuit 80). Different gain factors (so-called "gain") can hereby be provided for different charge amounts in the light-sensitive element 20, for example, a smaller gain factor for the amplifier circuit 80 than for the amplifier circuit 60. Such a selectable dual gain factor (so-called "dual gain") can also be provided in a four-transistor pixel 10 in accordance with FIG. 2.

In other embodiments (not shown), in addition to the amplifier circuits 60 and 80, and indeed in parallel therewith, yet a further amplifier circuit 80 having a different gain factor (so-called "triple gain") can be provided.

FIG. 3 illustrates, on the other hand, that the feedback capacitor 28 in accordance with FIG. 2 can, for example, also be provided in a five-transistor image sensor. The respective pixel 10 in accordance with FIG. 3 additionally comprises an overflow capacitor 30 and a further transfer gate 31. The further transfer gate 31 can be selectively controlled by the control circuit 40 via a control line TG2 to couple the readout node 22 to the overflow capacitor 30. The capacitance of the readout node 22 can hereby be selectively temporarily increased to be able to receive large charge amounts, which are generated in the light-sensitive element 20, at a high exposure of the pixel 10. The (temporary) increase of the capacitance of the readout node 22 associated therewith does not have a disadvantageous effect on the light sensitivity insofar as a high signal-to-noise ratio is anyway achieved at a high exposure.

For high exposures, and in particular for a readout of an overflow capacitor 30 in accordance with FIG. 3, the amplifier circuit 80 can be used that corresponds to the amplifier circuit explained in connection with FIG. 1. For high exposures, a plurality of amplifier circuits 80 of the same type can also be provided in parallel with one another that, however, have different gain factors (e.g. having amplifier capacitors 84 of different sizes), as explained above.

Figure 4:
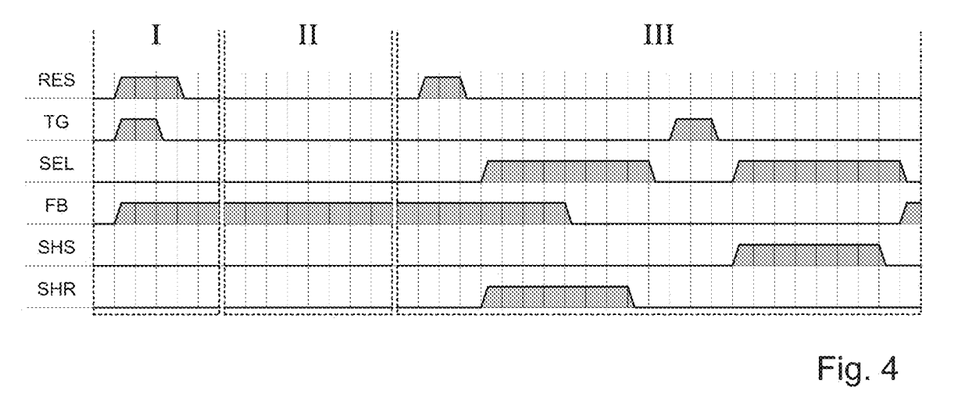
FIG. 4 shows a circuit diagram for a control circuit of an image sensor in accordance with the invention.

FIG. 4 illustrates a circuit diagram for a control circuit 40 of an image sensor in accordance with FIG. 2. The time switching sequence for a reset switch 26 (RES), a transfer gate 21 (TG), a selection switch 25 (SEL), a negative feedback switch 66 (FB), a signal value switch 71 (SHS) and a reference value switch 73 (SHR) is shown.

Before the exposure of the respective pixel 10 (time section I to the left of the two vertical bars), the reset switch 26 (RES) is briefly closed and the transfer gate 21 (TG) is briefly opened to empty the light-sensitive element 20, i.e. to remove the charge carriers present there. At the side of the column amplifier 65, the negative feedback switch 66 (FB) is closed. The exposure of the pixel 10 can now take place (time section II).

At the end of the exposure (time section III to the right of the two vertical bars), the readout process of the pixel 10 is initiated by briefly closing the reset switch 26 (RES) to remove charge formed by leakage currents and/or scattered light from the readout node 22.

The selection switch 25 (SEL) and the reference value switch 73 (SHR) are then closed so that a voltage signal of the converter transistor 24 corresponding to the (residual) charge at the readout node 22 reaches the input capacitor 61 via the column line 41. At the same time, the negative feedback switch 66 (FB) closed at the column amplifier 65 initially ensures that the column amplifier 65 works in the negative feedback mode and that the reference voltage VREF is applied to the negative input 67 of the column amplifier 65. The potential difference between the column line 41 and the negative input 67 of the column amplifier 65 causes the input capacitor 61 to charge accordingly. The negative feedback switch 66 (FB) is now opened so that the column amplifier 65 enters an amplification mode. The amplifier output signal now present is applied to the compensation line 42. Via the closed reference value switch 73 (SHR), the reference value capacitor 74 can be charged in accordance with the amplifier output signal or the voltage at the amplifier output 69. The reference value switch 73 (SHR) and the selection switch 25 (SEL) are then opened. The reference value capacitor 74 can be read out now or later.

Subsequently, the readout of the signal voltage value takes place. For this purpose, the transfer gate 21 (TG) is briefly closed so that charge can move from the light-sensitive element 20 to the readout node 22. The selection switch 25 (SEL) and the signal value switch 71 (SHS) are then closed. The voltage at the input capacitor 61 and thus the amplifier output signal, which charges the signal value capacitor 72, are hereby changed. A counter-feedback to the readout node 22 takes place at the same time. For this purpose, the amplifier output 69 of the column amplifier 65, whose amplifier output signal via the converter transistor 24, the column line 41 and the input capacitor 61 depends on the charge in the readout node 22, is fed back to the readout node 22 with a negative sign via the compensation line 42 and the feedback capacitor 28. In this counter-feedback operation, the column amplifier 65 compensates a voltage drop caused by the charge transfer at the readout node 22 in that the column amplifier 65 increases the voltage at the amplifier output 69 and thus at the compensation line 42. Thereafter, the signal value switch 71 (SHS) and the selection switch 25 (SEL) are opened. The signal value capacitor 72 can be read out now or later. Based on the difference between the read-out signal values and reference values, an offset-corrected value that corresponds to an exposure value of the pixel 10 can subsequently be determined.

REFERENCE NUMERAL LIST

10 pixel
20 light-sensitive element
21 transfer gate
22 readout node
23 parasitic capacitance
24 converter transistor
25 selection switch
26 reset switch
27 terminal of the voltage supply
28 feedback capacitor
29 signal output of the converter transistor
30 overflow capacitor
31 further transfer gate
40 control circuit
41 column line
42 compensation line
60 amplifier circuit for small charge amounts
61, 81 input capacitor
62 power source
63, 83 voltage node
64,84 amplifier capacitor
85 column amplifier
66, 86 negative feedback switch
67 negative input of the column amplifier
68 positive input of the column amplifier
69 amplifier output
70 column readout circuit
71, 91 signal value switch
72, 92 signal value capacitor
73,93 reference value switch
74, 94 reference value capacitor
80 amplifier circuit for large charge amounts

What is claimed is:

1. An image sensor for electronic cameras, said image sensor comprising a plurality of pixels for generating exposure-dependent signals, wherein a respective one of the plurality of pixels at least comprises:
   a light-sensitive element to generate electric charge from incident light;
   a readout node;
   a transfer gate to selectively couple the light-sensitive element to the readout node;
   a converter transistor to convert the charge present at the readout node into a voltage signal at a signal output; and
   a selection switch that is connected to the signal output of the converter transistor to selectively couple the signal output of the converter transistor to a column line of the image sensor that is associated with a plurality of pixels of the image sensor;
   wherein a column amplifier is associated with the column line, wherein the column line is coupled or can be coupled to a negative input of the column amplifier via an input capacitor, wherein the column amplifier has an amplifier output for outputting an amplifier output signal, wherein the amplifier output is connected to a column readout circuit and to a compensation line, wherein the compensation line is coupled via a respective feedback capacitor to the respective readout node of the pixels associated with the column line,
   wherein the converter transistor of the respective pixel, the column line, the input capacitor, the column amplifier, the compensation line and the feedback capacitor of the respective pixel form a counter-feedback loop for the readout node of the respective pixel, and
   wherein the input capacitor, the column amplifier and the feedback capacitor of the respective pixel are configured, in the event of a charge increase at the readout node of the respective pixel, to increase a voltage at the compensation line and hereby to substantially compensate a voltage change at the readout node.

2. An image sensor in accordance with claim 1, wherein the column amplifier is configured to generate the amplifier output signal in dependence on the voltage signal of the converter transistor of the respective pixel received via the column line at the input capacitor and to output the amplifier output signal to the column readout circuit and, via the compensation line, to the feedback capacitor.

3. An image sensor in accordance with claim 2, wherein the column readout circuit is configured to read out the amplifier output signal.

4. An image sensor in accordance with claim 1, wherein the input capacitor, the column amplifier and the feedback capacitor of the respective pixel are configured to keep a voltage at the readout node of the respective pixel substantially constant.

5. An image sensor for electronic cameras, said image sensor comprising a plurality of pixels for generating exposure-dependent signals, wherein a respective one of the plurality of pixels at least comprises:
   a light-sensitive element to generate electric charge from incident light;
   a readout node;
   a transfer gate to selectively couple the light-sensitive element to the readout node;
   a converter transistor to convert the charge present at the readout node into a voltage signal at a signal output; and a selection switch that is connected to the signal output of the converter transistor to selectively couple the signal output of the converter transistor to a column line of the image sensor that is associated with a plurality of pixels of the image sensor;

wherein a column amplifier is associated with the column line, wherein the column line is coupled or can be coupled to a negative input of the column amplifier via an input capacitor, wherein the column amplifier has an amplifier output for outputting an amplifier output signal, wherein the amplifier output is connected to a column readout circuit and to a compensation line, wherein the compensation line is coupled via a respective feedback capacitor to the respective readout node of the pixels associated with the column line, and wherein the column amplifier comprises a positive amplifier input to which a reference voltage is applied.

6. An image sensor in accordance with claim 5, wherein the negative amplifier input can be connected to the amplifier output via a negative feedback switch, wherein, by closing the negative feedback switch, the column amplifier can be brought into a negative feedback mode in which a potential difference between the voltage at the column line and the reference voltage is set at the input capacitor, and wherein, by opening the negative feedback switch, the column amplifier can be brought into an amplification mode in which the amplifier output signal represents a potential difference at the input capacitor that is changed with respect to the negative feedback mode.

7. An image sensor in accordance with claim 6, wherein the image sensor has a control circuit that is configured to first bring the column amplifier into the negative feedback mode for a readout of the respective pixel; subsequently to bring the column amplifier into the amplification mode; thereafter to at least partly open the transfer gate of the respective pixel for a short time in order to transmit charge into the readout node of the respective pixel; and then to control the column readout circuit to read out a signal value.

8. An image sensor in accordance with claim 7, wherein the respective pixel further has a reset switch to selectively couple the readout node to a reset potential, wherein the control circuit is configured to briefly close the reset switch of the respective pixel to remove charge present in the readout node of the respective pixel; and thereafter, in the amplification mode of the column amplifier and before opening the transfer gate, to control the column readout circuit to read out a reference value.

9. An image sensor in accordance with claim 5, wherein the respective pixel further comprises:

an overflow capacitor; and a further transfer gate to selectively couple the readout node to the overflow capacitor.

* * * * *